(12) United States Patent
Chow et al.

(10) Patent No.: US 7,796,538 B1
(45) Date of Patent: Sep. 14, 2010

(54) SYSTEM FOR ACCESSING END-TO-END BROADBAND NETWORK VIA NETWORK ACCESS SERVER PLATFORM

(75) Inventors: Albert T. Chow, Hillsdale, NJ (US); Kenny X. Huang, Somerset, NJ (US); Jinman Kim, Chatham, NJ (US); Robert R. Miller, Convent Station, NJ (US); Whenchu Ying, Cedar Knolls, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 173 days.

(21) Appl. No.: 11/743,750

(22) Filed: May 3, 2007

Related U.S. Application Data

(62) Division of application No. 10/189,776, filed on Jul. 8, 2002.

(51) Int. Cl.
*H04L 12/28* (2006.01)
*H04L 12/66* (2006.01)
*H04W 24/00* (2009.01)
*G06F 15/16* (2006.01)
*H04L 12/56* (2006.01)

(52) U.S. Cl. .................. 370/254; 370/352; 370/401; 455/456.3; 709/219

(58) Field of Classification Search .................. None
See application file for complete search history.

(56) References Cited

U.S. PATENT DOCUMENTS

| | | | |
|---|---|---|---|
| 5,680,439 | A | 10/1997 | Aguilera et al. |
| 6,119,001 | A | 9/2000 | Delis et al. |
| 6,215,790 | B1 * | 4/2001 | Voit et al. ............ 370/401 |
| 6,249,814 | B1 | 6/2001 | Shaffer et al. |
| 6,253,081 | B1 | 6/2001 | Koster |
| 6,308,203 | B1 | 10/2001 | Itabashi et al. |
| 6,353,737 | B1 | 3/2002 | Herzog |
| 6,584,312 | B1 | 6/2003 | Morin et al. |
| 6,671,510 | B1 | 12/2003 | Kelly et al. |
| 6,704,396 | B2 | 3/2004 | Parolkar et al. |

(Continued)

FOREIGN PATENT DOCUMENTS

DE    3428237 A1    2/1986

OTHER PUBLICATIONS

Liao, W., "Mobile Internet telephony: mobile extensions to H.323," 1999, pp. 12-19.

(Continued)

*Primary Examiner*—Gregory B Sefcheck
(74) *Attorney, Agent, or Firm*—Hope Baldauff Hartman LLC

(57) ABSTRACT

A method is described for providing personalized network access and services in a distributed end-to-end broadband transport network having a telecommunication device used by a user having a unique personal identifier, a premises-based broadband access agent (BAA), the BAA connected to and in communication with the telecommunication device, a switch specific to an underlying transport medium, the switch connected to and in communication with the distributed end-to-end broadband transport network, a network access server platform (NASP), the NASP connected to and in communication with the BAA and the switch, the NASP provides personalized network access and services on demand and a call connection agent (CCA) to complete a call placed by the user to a terminating user.

18 Claims, 2 Drawing Sheets

U.S. PATENT DOCUMENTS

| | | | |
|---|---|---|---|
| 6,742,036 | B1 | 5/2004 | Das et al. |
| 6,785,256 | B2 | 8/2004 | O'Neill |
| 6,804,533 | B1 | 10/2004 | Makinen |
| 6,853,648 | B1 | 2/2005 | Krstanovski et al. |
| 6,968,193 | B2 | 11/2005 | Van Loon et al. |
| 6,970,871 | B1 * | 11/2005 | Rayburn ............... 707/10 |
| 7,016,677 | B2 | 3/2006 | Fukasawa et al. |
| 7,039,037 | B2 * | 5/2006 | Wang et al. ............ 370/349 |
| 7,058,413 | B2 | 6/2006 | Lin et al. |
| 7,062,265 | B1 | 6/2006 | Chang et al. |
| 7,093,006 | B2 | 8/2006 | Sanjeev et al. |
| 7,096,015 | B2 | 8/2006 | Bridges et al. |
| 7,181,441 | B2 | 2/2007 | Mandato et al. |
| 7,184,415 | B2 | 2/2007 | Chaney et al. |
| 7,222,192 | B2 | 5/2007 | Allison et al. |
| 7,274,683 | B2 | 9/2007 | Segal |
| 7,433,682 | B1 * | 10/2008 | Moll et al. ............ 455/414.1 |
| 7,496,102 | B2 | 2/2009 | Chow et al. |
| 2001/0006519 | A1 * | 7/2001 | Voit ...................... 370/352 |
| 2002/0055351 | A1 | 5/2002 | Elsey et al. |
| 2002/0101880 | A1 | 8/2002 | Kim |
| 2002/0102973 | A1 | 8/2002 | Rosenberg |
| 2002/0118800 | A1 | 8/2002 | Martinez et al. |
| 2002/0154755 | A1 | 10/2002 | Gourraud |
| 2002/0173307 | A1 | 11/2002 | Salmivalli et al. |
| 2003/0005034 | A1 | 1/2003 | Amin |
| 2003/0035409 | A1 * | 2/2003 | Wang et al. ............ 370/349 |
| 2003/0048792 | A1 | 3/2003 | Xu et al. |
| 2003/0054809 | A1 | 3/2003 | Bridges et al. |
| 2003/0157942 | A1 | 8/2003 | Osmo |
| 2003/0228869 | A1 | 12/2003 | Chow et al. |
| 2004/0003058 | A1 | 1/2004 | Trossen |
| 2005/0113113 | A1 * | 5/2005 | Reed ...................... 455/456.3 |

OTHER PUBLICATIONS

Liao, Wanjiun, "Mobile Internet Telephony: Mobility Extensions to H.323," IEEE. Nov. 2001. pp. 1403-1414.
Liao, Wanjiun. Mobile Internet Telephony: Mobility Extensions to H.323. IEEE. Nov. 2001, pp. 1404-1414.
U.S. Official Action date Jul. 24, 2009 in U.S. Appl. No. 10/189,776.
U.S. Official Action dated Mar. 24, 2006 in U.S. Appl. No. 10/163,500.
U.S. Official Action dated Aug. 30, 2006 in U.S. Appl. No. 10/163,500.
U.S. Official Action dated Aug. 1, 2006 in U.S. Appl. No. 10/163,501.
U.S. Official Action dated Mar. 6, 2007 in U.S. Appl. No. 10/163,501.
U.S. Official Action dated Apr. 1, 2008 in U.S. Appl. No. 10/163,501.
U.S. Notice of Allowance and Allowability dated Oct. 14, 2008 in U.S. Appl. No. 10/163,501.
U.S. Official Action date Aug. 23, 2006 in U.S. Appl. No. 10/189,776.
U.S. Official Action date Jan. 24, 2007 in U.S. Appl. No. 10/189,776.
U.S. Official Action date Jun. 11, 2007 in U.S. Appl. No. 10/189,776.
U.S. Official Action date Dec. 5, 2007 in U.S. Appl. No. 10/189,776.
U.S. Official Action date Jun. 16, 2008 in U.S. Appl. No. 10/189,776.
U.S. Official Action date Mar. 3, 2009 in U.S. Appl. No. 10/189,776.
Mohammed Zaid, "Personal Mobility in PCS," 1994 IEEE Personal Communications; pp. 12-16.
U.S. Official Action dated Dec. 4, 2009 for U.S. Appl. No. 10/189,776.
U.S. Notice of Allowance / Allowability dated Apr. 19, 2010 in U.S. Appl. No. 10/189,776.

* cited by examiner

SYSTEM FOR ACCESSING END-TO-END BROADBAND NETWORK VIA NETWORK ACCESS SERVER PLATFORM

RELATED APPLICATIONS

This application is a divisional of U.S. application Ser. No. 10/189,776, filed on Jul. 8, 2002, the content of which is hereby incorporated by reference in its entirety.

This present application is related to U.S. patent application Ser. No. 10/163,500, entitled "Providing Mobility in a Distributed End-to-End Packet/Cell/Frame Network", by Albert Chow et al., which was filed on Jun. 7, 2002, now abandoned, and U.S. Pat. No. 7,496,102 entitled "Broadband Telecommunication Service with Personalized Service Capability for Mobile Terminals", by Albert Chow, which was filed on Jun. 7, 2002, and which issued on Feb. 24, 2009.

FIELD OF THE TECHNOLOGY

The present invention relates generally to the field of telecommunications and specifically to a personalized system and method for accessing a broadband network via a network access server platform (NASP).

BACKGROUND

Telecommunications have evolved from plain old telephone service (POTS) using a conventional wired line telephone and keypad. Circuit switched telecommunications have evolved from circuit-switched to end-to-end broadband packet/cell/frame networks. This evolution has enabled new services and new means of communication. In a true end-to-end broadband packet/cell/frame network environment, the use of traditional circuit-switch facilitated dial tone and numbering scheme (i.e., Directory Number (DN), E.164) as a method for establishing a link to someone is no longer applicable. User/customers/subscribers now expect easier telecommunications access as well as substantially more services. Users will have voice prompted greetings from an access network based system/service after a telephone/telecommunication device goes "off-hook", where users will utilize unique personal identifiers comparable to the email address format (e.g., anyone@provider.com).

SUMMARY

The present invention is applicable to current and future subscribers and integrates a service provider's residential and business services and a service provider's broadband transport network to provide personalized end-to-end packet/cell/frame based services.

The system and method described herein provides enhanced end-to-end packet telephony and conventional telecommunication services with distributed end-to-end packet network environments. Since the broadband transport methodology is irrelevant to the overall NASP service concepts, the Asynchronous Transfer Mode (ATM) with cell based transport, frame relay network and all transport methodology from the resident, business and small office/home office (SOHO) environments are all examples of underlying transport technologies and should be considered as exemplary broadband transport networks.

The emerging broadband (i.e., up to T1+rate) access from the home/business (via for example, cable/hybrid fiber coax (HFC) and generic digital subscriber line (xDSL)) environments facilitates a variety of new services including integrated packet voice, data, and multimedia applications. These advanced multimedia services/applications require a sophisticated user-to-network interaction to fulfill and communicate all the service criteria, and the simplicity of the conventional telephone keypad cannot fulfill these needs. New multi-modal user interfaces, such as speech/voice recognition will enable the user/consumer to interact with the network in a more human/natural, and sophisticated manner.

Personalized network access to a broadband network is achieved through the use of a NASP, which is a network centric service element that interfaces between a network access entity (e.g., BAA), a content service provider and a service providers network. End users are enabled to access network services through procedures other than via conventional telephone access methods such as a keypad, etc. The NASP controls many access procedures such as voice access, network signaling, integrating various generations of services and procedures and the integration of various network technologies. Examples of personalized network access include a voice greeting to a user after a telephone/telecommunication device goes "off-hook", asking what service the user needs, adding/modifying/removing and generally maintaining a personal address book for the user's contacts, maintaining various user-specific databases such as preferred calling plans, placing calls to contacts maintained in the user's personal address book, forwarding calls, screening calls and locating the most inexpensive calling plan for placing a call. All interactions with the network are via voice communications.

It is, therefore, an object of the present invention to provide personalized network access to an end-to-end broadband packet/cell/frame network using the Network Access Server Platform.

BRIEF DESCRIPTION OF THE DRAWINGS

The invention is best described with reference to the detailed description and the following figures, where.

DETAILED DESCRIPTION

Figure 1:
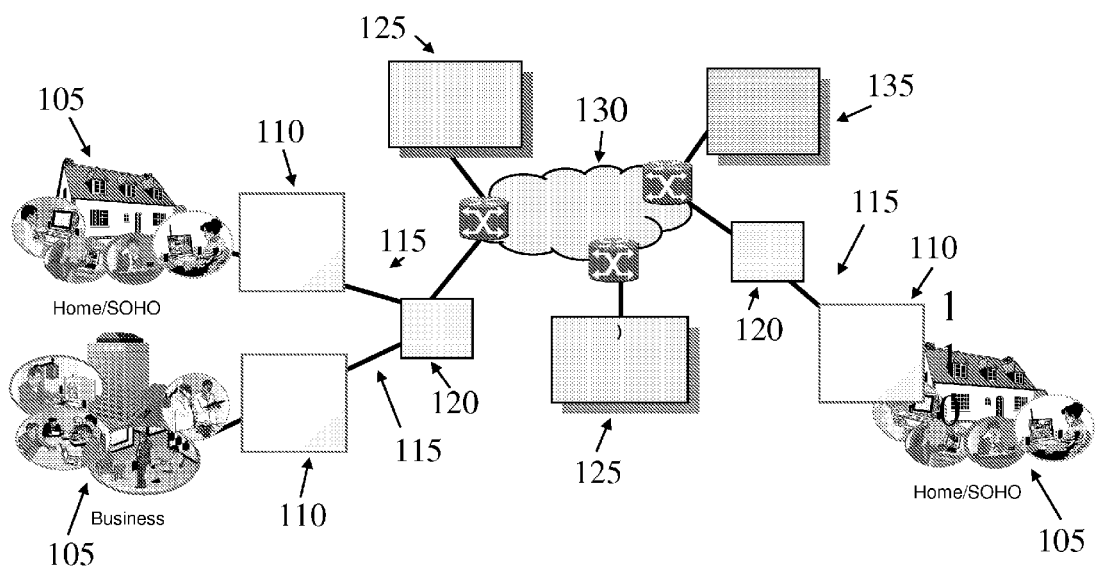
FIG. 1 shows an exemplary embodiment of an end-to-end broadband network including the NASP of the present invention.
Figure 2:
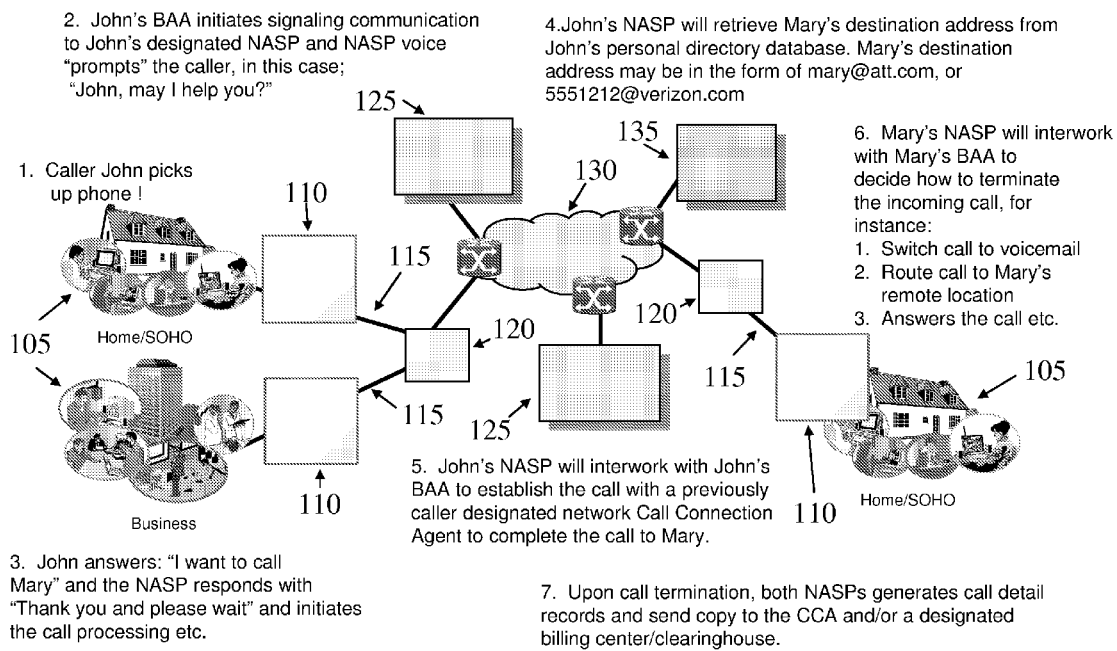
FIG. 2 shows an exemplary embodiment of an end-to-end broadband network including the NASP of the present invention and including an example of the services and features provided by the NASP.

The Network Access Server Platform (NASP) is a network centric service element that provides interworking functions between a network access entity(s), a content services provider(s) and a service provider's broadband packet/cell/frame network to facilitate services and applications. The NASP provides end users, in either residential, small office/home office (SOHO), business and public environments, the means to access the network centric services, the procedures that locate and deliver services, and the methodologies that allows the introduction of advanced services in a distributed intelligent manner by a service provider. Subscribers can customize their telecommunication needs, such as service and feature selections, maintenance of personal address books and directories, profiles and databases, and service preferences, etc. simply by programming the NASP anywhere and anytime. The NASP assists the subscriber in accessing telecommunication services via a service provider's broadband packet/cell/frame network and it replaces the conventional dial tone and telephone keypad, with technologies such as speech coding, interactive voice, voice recognition and text-to-speech conversion. When the user wishes to request a telecommunication service, he/she picks up the telephone/telecommunications device, or turns on a laptop/PC, or initiates the NASP application. The user will interact with the NASP instantaneously/directly via the premises-based Broadband Access Agent (BAA) to fulfill, initiate and terminate the service requests in a multi-session and multi-application scenarios. The NASP, based on the behavior of the user, interacts with the service provider's broadband packet/cell/frame network and the BAA to deliver network centric or content service provider's services to the end-users.

Each user can program the NASP via a web-based service management dialogue or through an interactive voice session supported by the NASP via BAA, and the NASP provides personalized services to the user on demand. In an exemplary embodiment, the NASP can be programmed via a web-based dialogue box or pull-down manual after the user logs onto the service (i.e., turn on the laptop, PDA etc.). The dialogue box or pull-down manual can be installed as a part of service initialization process, for instance from a CD issued by the service provider to the broadband service user/subscriber. In turn, the user will install the dialogue software onto their choice of communications devices including stationary PC, laptop, PDA etc. The pull-down manual/dialogue will allow the user/subscriber to program their service preferences and personal profile, which will, in turn, be transmitted to the NASP via the BAA. NASP also eliminates the necessity of consumers programming each of their communication devices with their preferences.

For a service provider, the NASP provides network access control functions and acts as a broker-agent to provide the bridge that links a service provider broadband packet/cell/frame network and its network centric services to the end user. In addition, the NASP supports network related security management including services such as the subscriber authentication, services authorization; call session control; billing and accounting; subscriber identity related naming and directory services; and mobility management (e.g., terminal, session, personal, service, and number portability) for the end-users. For example, a user may carry their telecommunication device to another location and connect to a telecommunication jack at the new location. Once connected to the telecommunication jack powering the telecommunication device on the BAA at the new location will recognize the telecommunication device and signal the NASP accordingly to retrieve the personalized databases and provide the user with their personalized services. For network simplicity and distribution of network intelligence, the NASP partitions services from network control/transport and in turn reduces deployment costs effectively. Furthermore, the distributed network intelligence that NASP promotes flexible and efficient network centric service creation, services upgrades, and optimally provides best quality of service (QoS) to the users.

In an exemplary embodiment depicted in FIG. 1 comprises a distributed network centric network where a user operating from a business, home or SOHO 105 is connected to a premises-based BAA 110. The BAA 110 provides the intelligence and forms a part of the service provider's media specific equipment at the customer site. In an exemplary embodiment, the BAA 110 would form a part of a cable or xDSL modem provided to a user by the service provider. BAA 110 is connected to a switch 120 via any one of a number of underlying network control/transport technologies. Depicted in FIG. 1 is xDSL 115 using an IP DSL switch 120. The underlying network control/transport services may be provided by ATM, HFC, etc. using a corresponding compatible switch. Switch 120 (which may be, for example, an IP DSL switch) is connected to NASP 125 which acts as an agent/broker for services and features requested and subscribed to by a user. Switch 120 is a soft switch, which, for example, is using an xDSL media and separates voice from data. NASP 125 interworks with broadband transport network 130. NASP 125 interworks with BAA 110 to establish the call with a previous caller designated network Call Connection Agent (CCA) 135 to complete the call via broadband transport network 130. The CCA 135 is responsible for authentication, authorization and accounting and may be integrated with the NASP 125. The NASP is connected to the user via the premises based BAA, a switch and the broadband transport network via the internet. The NASP is like a 5ESS switch but is packet switched rather than circuit switched and is intended to provide similar but enhanced services as will be described herein. The NASP functions above the network control/transport layer and provides the personalized services described herein via an interface to the broadband transport network. The NASP provides services users are already familiar with and want such as call forwarding, caller identification etc. Multiple content service providers (CSPs) (not shown) are also connected to and in communication with the distributed end-to-end broadband transport network and provide personalized services to a user via the NASP 125.

Examples of the NASP usage:
1. John picks telephone (e.g., POTS, ISDN, and Internet telephony protocol) or turns on his laptop/PDA etc.
2. John's BAA 110 initiates signaling communication to John's designated NASP 125, which sends a voice greeting to John; "AT&T, John, may I help you?"
3. John voices his request to his designated NASP 125 to call his friend Mary and John's designated NASP 125 responds with "Thank you and please wait".
4. John's designated NASP 125 will retrieve Mary's destination address from John's personal directory database (e.g., John's address book) maintained by John's designated NASP 125. Mary's destination address may be in the form of mary@att.com, or 5551212@verizon.com. John's designated NASP 125 places a call to Mary.
5. John's designated NASP 125 will interwork with John's BAA 110 to establish the call with a previous caller designated network Call Connection Agent 130 to complete the call to Mary. John instructs NASP to forward all calls from Mary to his wireless telephone.
6. Mary's NASP 125 will interwork with Mary's BAA 110 to decide how to terminate the incoming call, for instance:
   a. Switch call to voicemail
   b. Route call to Mary's remote location
   c. Answers the call etc.
7. Upon call termination, both NASPs 125 generate call detail records and send copies to the CCA 135 and/or a designated billing center/clearinghouse.

Additionally, the following are also possible instructions John may give his designated NASP 125. John instructs his designated NASP 125 to add/remove entries from his address book. John instructs his designated NASP 125 to place an international call using the most inexpensive calling plan that is currently offered by the service providers. John's designated NASP 125 will screen all incoming calls to check disposition status based on John's instructions, e.g., complete the call, forward the call to voicemail, or reject the call.

The key features of the NASP of the present invention are to provide a distributed network centric service architecture within a broadband packet/cell/frame network; to provide the procedures and methods to manage mobility for terminal, personal, session and services and numbering; to provide the signaling and messages necessary for services between the NASP and the user end-equipment (e.g., telephone, laptop, PDA etc.); to provide the signaling and messages necessary for services between a service provider network and the NASP; to support the services and call features among the NASP, user end equipment, and the service provider network; to provide the procedures and methods to integrate 2nd, $3^{rd}$, and 4th generation wireless access technologies and services via the NASP; and to provide the procedures and methods that integrate wired broadband network access technologies including cable, XDSL etc. via the NASP.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein. Moreover, related applications U.S. patent application Ser. No. 10/163,500, filed Jun. 7, 2002, now abandoned, and U.S. Pat. No. 7,496,102, filed Jun. 7,2002, and issued on Feb. 24, 2009, are hereby incorporated by reference in their entirety.

What we claim is:

1. A method for providing personalized network access and services in a distributed end-to-end broadband transport network comprising:
   switching a communication specific to an underlying transport medium via a network-based switch, the switch being connected to and in communication with the distributed end-to-end broadband transport network;
   providing personalized network access and services on demand via a network access server platform (NASP), the NASP being connected to and in communication with a first premises-based broadband access agent (BAA) associated with a first location, the first BAA being connected to and in communication with a telecommunication device and the network based-switch;
   receiving a signal indicative of a connection of the telecommunication device at a second BAA associated with a second location, wherein the first location and the second location are different;
   receiving a signal indicative of a powering on of the telecommunication device;
   recognizing the telecommunication device at the second BAA;
   in response to the telecommunication device being taken off-hook, providing, via an interactive voice session with the NASP, a personalized service in connection with the telecommunication device; and
   completing a call placed by the telecommunication device at the second location via a call connection agent.

2. The method according to claim 1, further comprising providing the personalized service in connection with the telecommunication device responsive to receiving an input of an indicia of a user-specific identification.

3. The method according to claim 1, wherein providing personalized network access and services on demand via a NASP comprises interfacing with a content service provider to provide the personalized network access and services to the telecommunication device at the first location and at the second location.

4. The method according to claim 1, further comprising integrating, via the NASP, $2^{nd}$, $3^{rd}$ and $4^{th}$ generation wireless access technologies and services.

5. The method according to claim 1, further comprising supporting the telecommunication device in a customization of telecommunication requirements by maintaining personal databases including address books, directories, profiles and service preferences associated with the telecommunication device.

6. The method according to claim 1, wherein the personalized service comprises providing a greeting to a user of the telecommunication device, receiving requests associated with the telecommunication device from the user and providing telecommunication services based on the requests, and maintaining an address book for the user.

7. The method according to claim 6, wherein the telecommunication services comprise forwarding calls associated with the telecommunication device, screening calls associated with the telecommunication device, and locating a preferred calling plan for placing the call.

8. The method according to claim 1, further comprising receiving personalized settings to program the NASP through an interactive voice session supported by the NASP via the first BAA.

9. The method according to claim 1, further comprising generating, at the NASP, call detail records of the call placed by the telecommunication device at the second location.

10. A method for providing personalized network access and services in a distributed end-to-end broadband transport network comprising:
    switching a communication specific to an underlying transport medium via a network-based switch, the switch being connected to and in communication with the distributed end-to-end broadband transport network;
    providing personalized network access and services on demand via a network access server platform (NASP), the NASP being connected to and in communication with a first premises-based broadband access agent (BAA), the first BAA being connected to and in communication with a telecommunication device at a first location and the network-based switch;
    providing mobility management for the telecommunication device via the NASP, the mobility management comprising at least one of terminal mobility, session mobility, personal mobility, service mobility, and number portability;
    receiving a signal indicative of a connection of the telecommunication device to a second BAA at a second location, wherein the first location and the second location are different;
    receiving a signal indicative of a powering on of the telecommunication device;
    recognizing the telecommunication device at the second BAA;
    in response to the telecommunication device being taken off-hook, providing, via an interactive voice session with the NASP, a personalized service in connection with the telecommunication device at the second location; and
    completing a call placed by the telecommunication device at the second location via a call connection agent.

11. The method according to claim 10, further comprising providing the personalized service in connection with the telecommunication device responsive to receiving an input of an indicia of a user-specific identification.

12. The method according to claim 10, wherein providing personalized network access and services on demand via a NASP comprises interfacing with a content service provider to provide the personalized network access and services to the telecommunication device at the first location and at the second location.

13. The method according to claim 10, further comprising integrating, via the NASP, $2^{nd}$, $3^{rd}$ and $4^{th}$ generation wireless access technologies and services.

14. The method according to claim 10, further comprising supporting the telecommunication device in a customization of telecommunication requirements by maintaining personal databases including address books, directories, profiles and service preferences associated with the telecommunication device.

15. The method according to claim 10, wherein the personalized service comprises providing a greeting to a user of the telecommunication device, receiving requests associated with the telecommunication device from the user and providing telecommunication services based on the requests, and maintaining an address book for the user.

16. The method according to claim 15, wherein the telecommunication services comprise forwarding calls associated with the telecommunication device, screening calls associated with the telecommunication device, and locating a preferred calling plan for placing the call.

17. The method according to claim 10, further comprising receiving personalized settings to program the NASP through an interactive voice session supported by the NASP via the first BAA.

18. The method according to claim 10, further comprising generating, at the NASP, call detail records of the call placed by the telecommunication device at the second location.

\* \* \* \* \*